United States Patent
Engelhorn

(10) Patent No.: US 12,271,953 B2
(45) Date of Patent: *Apr. 8, 2025

(54) SYSTEM AND METHOD OF USING AN IMAGE OBJECT AS A VISUAL DATA CONTAINER

(71) Applicant: STATE FARM MUTUAL AUTOMOBILE INSURANCE COMPANY, Bloomington, IL (US)

(72) Inventor: Amy Engelhorn, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,791

(22) Filed: Feb. 8, 2024

(65) Prior Publication Data

US 2024/0185353 A1 Jun. 6, 2024

Related U.S. Application Data

(63) Continuation of application No. 17/092,922, filed on Nov. 9, 2020, now Pat. No. 11,935,124, which is a
(Continued)

(51) Int. Cl.
*G06Q 40/08* (2012.01)
*G06F 3/0484* (2022.01)
*G06F 3/04842* (2022.01)

(52) U.S. Cl.
CPC .......... *G06Q 40/08* (2013.01); *G06F 3/0484* (2013.01); *G06F 3/04842* (2013.01)

(58) Field of Classification Search
None
See application file for complete search history.

(56) References Cited

U.S. PATENT DOCUMENTS 10,210,575 B1 2/2019 Engelhorn
2005/0120296 A1* 6/2005 Zeuli ............... G16H 10/20
715/277

(Continued)

OTHER PUBLICATIONS

Non-Final Office Action for U.S. Appl. No. 14/824,355 dated Dec. 4, 2015.
(Continued)

*Primary Examiner* — Joseph W. King
*Assistant Examiner* — Liz P Nguyen
(74) *Attorney, Agent, or Firm* — MARSHALL, GERSTEIN & BORUN LLP

(57) ABSTRACT

A method and system for associating information regarding an object with image objects is disclosed, wherein each image object is a visual data containers including an image associated with the object and data items relating to the object. A user may interact with a graphical user interface to create, modify, and associate image objects by means of the associated images. Information regarding the objects may be associated therewith by means of the image objects, and image objects may be associated with other image objects to generate associations between information regarding the underlying objects. Information regarding other image objects or the associated image may be used to determine information regarding the object, which may be associated with the image object. In some embodiments, associating two or more image objects may associate the underlying objects for purposes of insurance policies or may generate a new insurance policy based on the image objects.

20 Claims, 7 Drawing Sheets

Related U.S. Application Data continuation of application No. 16/238,108, filed on Jan. 2, 2019, now Pat. No. 10,832,344, which is a continuation of application No. 14/824,355, filed on Aug. 12, 2015, now Pat. No. 10,210,575.

(56) References Cited

U.S. PATENT DOCUMENTS

| | | |
|---|---|---|
| 2009/0265385 A1 | 10/2009 | Beland et al. |
| 2010/0027896 A1* | 2/2010 | Geva ................ G06V 30/40 382/229 |
| 2013/0204645 A1 | 8/2013 | Lehman et al. |
| 2014/0132409 A1* | 5/2014 | Billman ............. G08B 19/00 463/31 |

OTHER PUBLICATIONS

Final Office Action for U.S. Appl. No. 14/824,355 dated Jun. 7, 2016.
Non-Final Office Action for U.S. Appl. No. 14/824,355 date4d Dec. 19, 2016.
Final Office Action for U.S. Appl. No. 14/824,355 dated Jun. 9, 2017.
Non-Final Office Action for U.S. Appl. No. 14/824,355 dated Nov. 3, 2017.
Final Office Action for U.S. Appl. No. 14/824,355 dated Jun. 28, 2018.
Notice of Allowance for U.S. Appl. No. 14/824,335 dated Oct. 3, 2018.
Non-Final Office Action for U.S. Appl. No. 16/238,108 dated Jul. 27, 2020.
Notice of Allowance for U.S. Appl. No. 16/238,108 dated Sep. 22, 2020.

* cited by examiner

210

| ID | Image | Data |
|---|---|---|
| 1 | XXX | AAA |
| 2 | YYY | BBB |
| 3 | ZZZ | CCC |
| ⋮ | ⋮ | ⋮ |

220

| Data | Item 1 | Item 2 | Item 3 | Policy | Associations |
|---|---|---|---|---|---|
| AAA | xyz | ab |  | 012579 | 2,3 |
| BBB |  | ab | grs | 012579 | 1 |
| CCC | grs |  | xyz | 012579 | 1 |
| ⋮ | ⋮ | ⋮ | ⋮ | ⋮ | ⋮ |

230

| Image | File |
|---|---|
| XXX |  |
| YYY |  |
| ZZZ |  |
| ⋮ | ⋮ |

*FIG. 2*

SYSTEM AND METHOD OF USING AN IMAGE OBJECT AS A VISUAL DATA CONTAINER

CROSS-REFERENCE TO RELATED APPLICATIONS

This application is a continuation of U.S. patent application Ser. No. 17/092,922, filed on Nov. 9, 2020, which is a continuation of U.S. patent application Ser. No. 16/238,108, filed on Jan. 2, 2019, which is a continuation of U.S. patent application Ser. No. 14/824,355, filed on Aug. 12, 2015, the entirety of which are incorporated herein by reference.

TECHNICAL FIELD

The present disclosure generally relates to a system and a method for using image objects to represent data and connections between objects.

BACKGROUND

Insurance exists to provide financial protection against physical damage and/or bodily injury resulting from accidental causes or liability that could arise therefrom. Typically, a customer purchases an insurance policy for a policy rate or premium having a specified term and covering particular types of risks. Insurance policies are typically further limited to coverage of specific property, persons, or other specific objects or interests. In exchange for payments from the insured customer, an insurer pays for damages or losses to the insured which are caused by covered perils, acts, or events as specified by the language of the insurance policy. Conventionally, obtaining or purchasing an insurance policy has required the insured customer, an agent, or a broker to provide information regarding insured objects, as well as other information relevant to the determination of the risk of providing a type or level of insurance coverage.

The abundance of data associated with each insurance policy places a cognitive load on customers and sales personnel, requiring them to provide a large amount of information. This cognitive load may contribute to a higher number of errors or inaccuracies in the information provided or entered. Additionally, the amount of information required to generate or adjust an insurance policy is frequently difficult to display in a concise manner on a display of a computer device. This problem is particularly acute for mobile devices such as smart phones and tables, the display screens of which are typically significantly smaller than desktop computers. Moreover, entry of information relevant to insurance policies may require redundant entry of data otherwise already available, thereby increasing the time required to obtain a quote or policy. The invention herein is addressed to these and related aspects of the current process of quoting, issuing, and adjusting insurance policies.

SUMMARY

The present application discloses a method, system, and computer-readable medium storing instructions for associating information with image objects. In some embodiments, the method, system, or instructions may further cause or facilitate the creating or adjusting an insurance policy relating to one or more objects by creating, editing, or associating image objects. One embodiment includes a computer-implemented method including receiving an indication of a first image object; receiving an indication of a second image object; determining one or more data items associated with the second object based upon the second image object; causing the first image and the second image to be presented to a user; receiving an indication of a request from the user to associate the second image object with the first image object; causing the second image object to be associated with the first image object based upon the received indication from the user; and/or adjusting the insurance policy based upon the one or more data items associated with the second object. The first image object may identify a first object associated with an insurance policy and a first image, and the second image object may identify a second object not associated with the insurance policy and a second image. Additionally, the first image and the second image may be presented to the user via a client device, and the indication of the request from the user to associate the second image object with the first image object may include a selection by the user of the first image and the second image.

In some embodiments, the second object not associated with the insurance policy may include an insurable object, in which case adjusting the insurance policy may include causing the insurable object to be covered by the insurance policy. Additionally, or alternatively, the second object not associated with the insurance policy may include at least one of the following: a bank account, a brokerage account, another insurance policy, a lienholder, a secured party, a dependent, a spouse, or a beneficiary. In further embodiments, the first image object associated with the insurance policy may represent a type of insurance policy the user may purchase but which the user has not yet purchased, and the second object not associated with the insurance policy may be associated with an insurable object, in which case the received indication of the request from the user to associate the second image object with the first image object may further indicate a request to create a new insurance policy covering the second object. In response to such request, adjusting the insurance policy may include causing the new insurance policy to be created and cover the insurable object.

In some embodiments, determining the one or more data items associated with the second object may include: determining an identifier of the second object based upon the received second image object; requesting information regarding the second object from a data source based upon the identifier; receiving at least one of the one or more data items based upon the request; and/or associating the received at least one of the one or more data items with the second image object. The identifier may be determined automatically based at least in part upon at least one of the following: an image captured by the user via the client device, a sound captured by the user via the client device, or a geographical location determined based upon the location of the client device.

Receiving the indication of the second image object may include: determining one or more suggested image objects that may be associated with the first image object based upon information associated with the first image object without receiving a request from the user to determine the one or more suggested image objects; causing the one or more images associated with suggested image objects to the user via the client device; and/or receiving a selection by the user of at least one of the one or more suggested images. Receiving the indication of the second image object may also include: receiving an indication from the user associated with the second object; determining one or more suggested image objects that may be associated with the received indication from the user associated with the second object; causing one or more images associated with the one or more suggested image objects to be presented to the user via the client device; and/or receiving a selection by the user of at least one of the one or more suggested image objects.

Some embodiments may further include the following: determining one or more missing data items associated with the second object based upon the insurance policy; causing at least one of the one or more missing data items to be presented to the user via the client device; receiving information from the user regarding the at least one of the one or more missing data items; storing the received information regarding the at least one of the one or more missing data items; and/or associating the stored information with the second image object. Additional or alternative embodiments may further include: determining one or more missing data items associated with the second object based upon the insurance policy; determining at least one suggested data item for at least one of the one or more missing data items based upon information associated with the first image object and the data items associated with the second image object; causing the at least one suggested data item to be presented to the user via the client device; receiving an indication from the user via the client device verifying the at least one suggested data item; and/or associating the verified at least one suggested data item with the second image object. In any of these embodiments, the missing data items may indicate types of information required for adjusting the insurance policy for which no data is associated with the second image object.

Another embodiment includes a computer system for associating information with image objects, comprising: one or more processors; a program memory storing executable instructions that, when executed by the one or more processors, cause the computer system to: receive an indication of a first image object; receive an indication of a second image object; determine one or more data items associated with the second object based upon the second image object; cause the first image and the second image to be presented to a user; receive an indication of a request from the user to associate the second image object with the first image object; cause the second image object to be associated with the first image object based upon the received indication from the user; and/or adjust the insurance policy based upon the one or more data items associated with the second object. Yet another embodiment includes a tangible, non-transitory computer-readable medium storing instructions for associating information with image objects that, when executed by one or more processors of a computer system, cause the computer system to: receive an indication of a first image object; receive an indication of a second image object; determine one or more data items associated with the second object based upon the second image object; cause the first image and the second image to be presented to a user; receive an indication of a request from the user to associate the second image object with the first image object; cause the second image object to be associated with the first image object based upon the received indication from the user; and/or adjust the insurance policy based upon the one or more data items associated with the second object.

BRIEF DESCRIPTION OF THE DRAWINGS

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 2 illustrates a diagram of an exemplary embodiment of data structures composing image objects representing insurable objects or other objects relevant to insurance policies;

DETAILED DESCRIPTION

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

As used herein, the term "insurable object" includes any person, real property, or personal property (tangible or intangible), as well as any proprietary, contractual, or other legally cognizable interest of any person or entity. Additionally, unless context dictates otherwise, the term "object" may refer to real property, personal property, intellectual property, legally cognizable contractual or other interests, persons, or entities, regardless of whether such may be insured or insurable and regardless of ownership thereof. Similarly, a "user" may include an actual user of a computing device or an insurance customer, potential customer, or other interested party on whose behalf another person interacts with a computer system.

Figure 1:
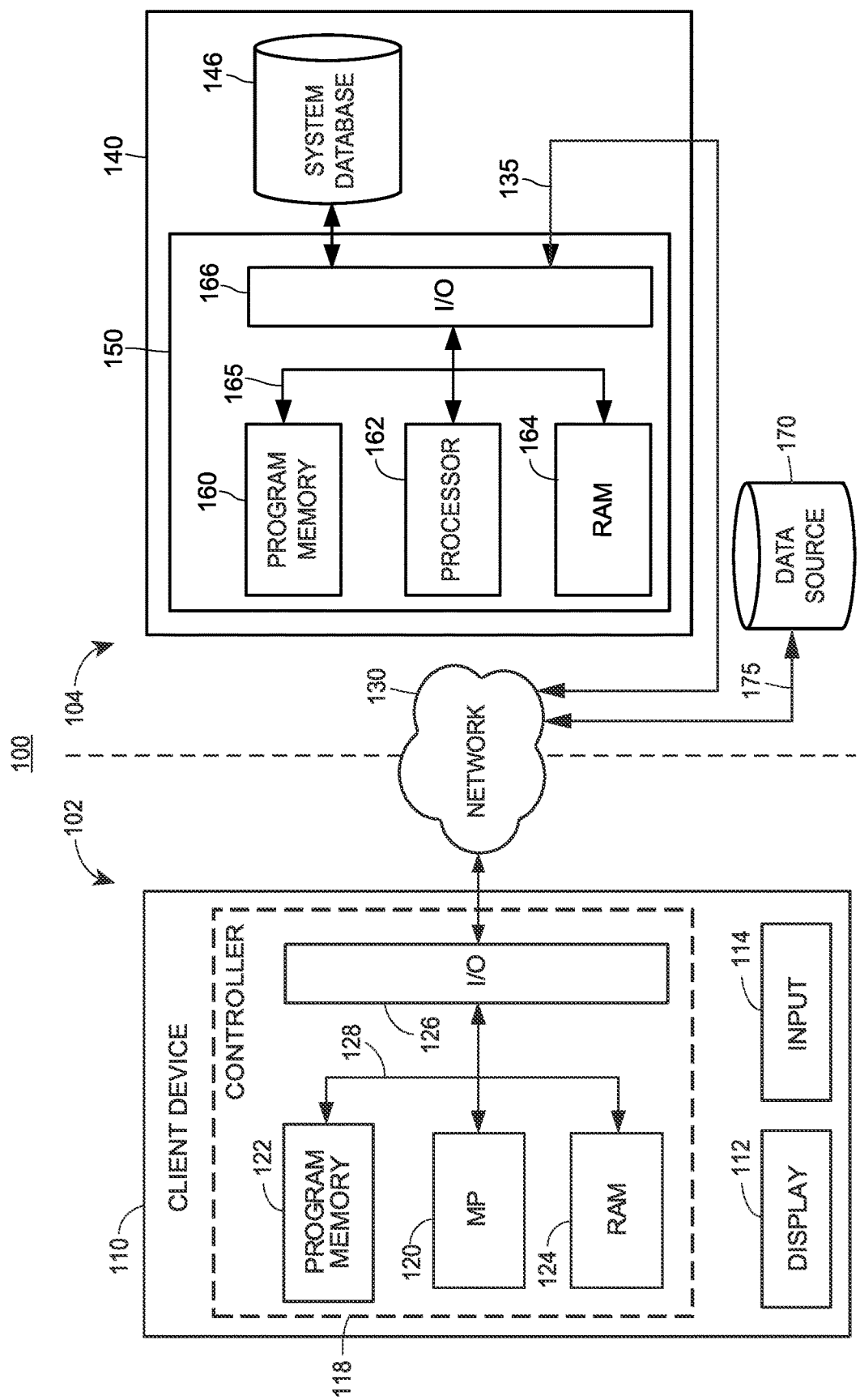
FIG. 1 illustrates a block diagram of an exemplary image object system on which the methods described herein may operate in accordance with the described embodiments.

FIG. 1 illustrates a block diagram of an exemplary image object system 100. The high-level architecture includes both hardware and software applications, as well as various data communications channels for communicating data between the various hardware and software components. The image object system 100 may be roughly divided into front-end components 102 and back-end components 104. The front-end components 102 allow a user to create, modify, use, and view representations of image objects via a client device 110. The front-end components 102 may communicate with the back-end components 104 via a network 130. The back-end components 104 may use one or more servers 140 to process the data provided by the front-end components 102 and other sources to generate, store, index, update, and transmit information relating to the image objects. The server 140 may be owned, operated, maintained, or used by an insurer or a party acting on behalf of the insurer to process information for creating or changing aspects of insurance policies. Additionally, or alternatively, the server 140 may request or receive information from one or more data sources 170, which may be stored with data provided by the client device 110 in a system database 146.

The front-end components 102 may be disposed within one or more client devices 110, which may include a desktop computer, notebook computer, netbook computer, tablet computer, or mobile device (e.g., a cellular telephone, smart phone, wearable computer, etc.). The client device 110 may include a display 112, an image capture unit 114, a controller 118, a Global Positioning System (GPS) unit 116, and an input (not shown). The input may include a "soft" keyboard that is displayed on the display 112 of the client device 110, an external hardware keyboard communicating via a wired or a wireless connection (e.g., a Bluetooth keyboard), an external mouse, or any other suitable user-input device. The controller 118 includes one or more microcontrollers or microprocessors (MP) 120, a program memory 122, a RAM 124, and an I/O circuit 126, all of which are interconnected via an address/data bus 128. The program memory 122 may include an operating system, a data storage, a plurality of software applications, and a plurality of software routines. The program memory 122 may include software applications, routines, or scripts for implementing part or all of the methods 400-700 or for communicating with the server 140 via the network 130. In some embodiments, the controller 118 may also include, or otherwise be communicatively connected to, other data storage mechanisms (e.g., one or more hard disk drives, optical storage drives, solid state storage devices, etc.) that reside within the client device 110. It should be appreciated that although FIG. 1 depicts only one microprocessor 120, the controller 118 may include multiple microprocessors 120. Similarly, the memory of the controller 118 may include multiple program memories 122 or multiple RAMs 124. Although the FIG. 9 depicts the I/O circuit 126 as a single block, the I/O circuit 126 may include a number of different types of I/O circuits. The controller 118 may implement the program memories 122 or the RAMs 124 as semiconductor memories, magnetically readable memories, or optically readable memories, for example.

In some embodiments, the front-end components 102 may communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these, etc. Where the network 130 comprises the Internet, data communications may take place over the network 130 via an Internet communication protocol.

The back-end components 104 may include one or more servers 140 communicatively connected to the network 130 by a link 135. Each server 140 may include one or more processors 162 adapted and configured to execute various software applications and components of the system 100, in addition to other software applications. The server 140 may further include a database 146, which may be adapted to store data related to the system 100, such as image objects, images associated with the objects, and information regarding the image objects. The server 140 may access data stored in the database 146 upon receiving a request for data from the client device 110. The server 140 may have a controller 150 that is operatively connected to the database 146. It should be noted that, while not shown, additional databases may be linked to the controller 150 in a known manner. The controller 150 may include a program memory 160, a processor 162, a RAM 164, and an I/O circuit 166, all of which may be interconnected via an address/data bus 165. As with the controller 118, it should be appreciated that although only one microprocessor 162 is shown, the controller 150 may include multiple microprocessors 162. Similarly, the memory of the controller 150 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example. The server 140 may further include a number of software applications or routines stored in a program memory 160. In some embodiments, these applications or routines may form modules when implemented by the processor 162, which modules may implement part or all of the methods 400-700 described elsewhere herein. Such modules may include the following: a data acquisition module for requesting and obtaining information from the user, database 146, or other data sources 170; an indexing module for receiving, retrieving, creating, updating, and associating image objects or information associated with image objects; an image recognition module for identifying objects within images; a text recognition module for identifying and processing text in images; an insurance module for creating and adjusting insurance policies; and a display module for causing information to be displayed to the user. In further embodiments, the various software applications may include a web server application responsible for generating data content to be included in web pages sent from the server 140 to the client device 110.

The back-end components 104 may further include one or more data sources 170, communicatively connected to the network 130 via link 175. The data sources 170 may include public or proprietary databases including information that may be associated with image objects, such as information regarding the identity, location, or characteristics associated with an image object. For example, a data source 170 may include information regarding real property, including the location, size, assessed value, improvements, or ownership of the property. In some embodiments, the data sources 170 may be owned, maintained, or administered by third parties. Additionally, or alternatively, the data sources 170 may include databases maintained by an insurer or other entity that operates, controls, or administers the server 140.

A user may launch a client application on the client device 110 to communicate with the server 140. Additionally, the customer or the user may also launch or instantiate any other suitable user interface application (e.g., via a web browser). Similarly, the server 140 may implement one or more programs, routines, applications, or modules to communicate with the client device 110 or data sources 170, obtain information, process information, create or change image objects, associate image objects, or create or adjust insurance policies related to the image objects. In some embodiments, the server 140 may further execute software programs or applications as a web server. In some embodiments, the client device 110 may operate as a thin client device, wherein substantially all of the processes that would be implemented at the client device 110 may be executed at or directed by the server 140.

FIG. 2 illustrates a diagram of an exemplary embodiment of data structures 200 composing image objects representing insurable objects or other objects relevant to insurance policies. The data structures 200 are represented in a tabular format as a plurality of distinct tables, but any number of tables may be used and may be stored in one or more databases 146 in any computer-readable manner. In a preferred embodiment, the information stored in the database 146 may be encrypted to protect against unauthorized use. A plurality of image objects are represented in the image object table 210, which associates an image with data items for each object. The entries of the Data column of the image object table 210 may reference indexed rows in a corresponding data items table 220, and the entries of the Image column of the image object table 210 may reference indexed rows in a corresponding image table 230. In some embodiments, the ID column of the image object table 210 may serve to identify the image objects associated with a user, customer, insurance policy, or account.

The data table 220 may include a plurality of data items associated with each image object, and may be indexed by the entry in the Data column. Each of one or more data item columns (e.g., Item 1, Item 2, Item 3) may contain data items regarding some aspect of the object represented by the data object. For example, a data object associated with a vehicle may include information regarding the make, model, year, mileage, condition, etc. of the vehicle. In addition, data item columns may also including information regarding insurance policies (e.g., the Policy column) or associations with other objects (e.g., the Associations column). For example, where data object 1 in image object table 210 is a vehicle, data objects 2 and 3 may be drivers associated with the vehicle. In such example, the Associations column in data table 220 may indicate that the vehicle (indexed by Data column entry AAA) is associated with both drivers (ID column entries 1 and 2, corresponding to Data column entries BBB and CCC), and each of the drivers may have entries in the Associations column indicating associations with the vehicle. Although the data table 220 is shown as containing entries indicating associations between data objects, other embodiments may use a separate association table to record such associations or may use additional columns in the image object table to record such associations.

The image table 230 may similarly include entries indicating the location of images associated with each image object in the image object table 210. In some embodiments, the entries in the Image column in the image object table 210 may reference entries in the Image column in the image table 230, which may correspond to entries it the File column of the image table 230. The File column may, in turn, indicate the location of an image file storing data from which an image may be generated on the client device 110 in any appropriate standard or proprietary file format. In some embodiments, the image locations may be either in memory associated with the server 140 or the client device 110. Such images may include photographs, user-defined custom images, or standard icons, which may be used to graphically represent the image object to the user via the display 112 of the client device 110.

Figure 3:
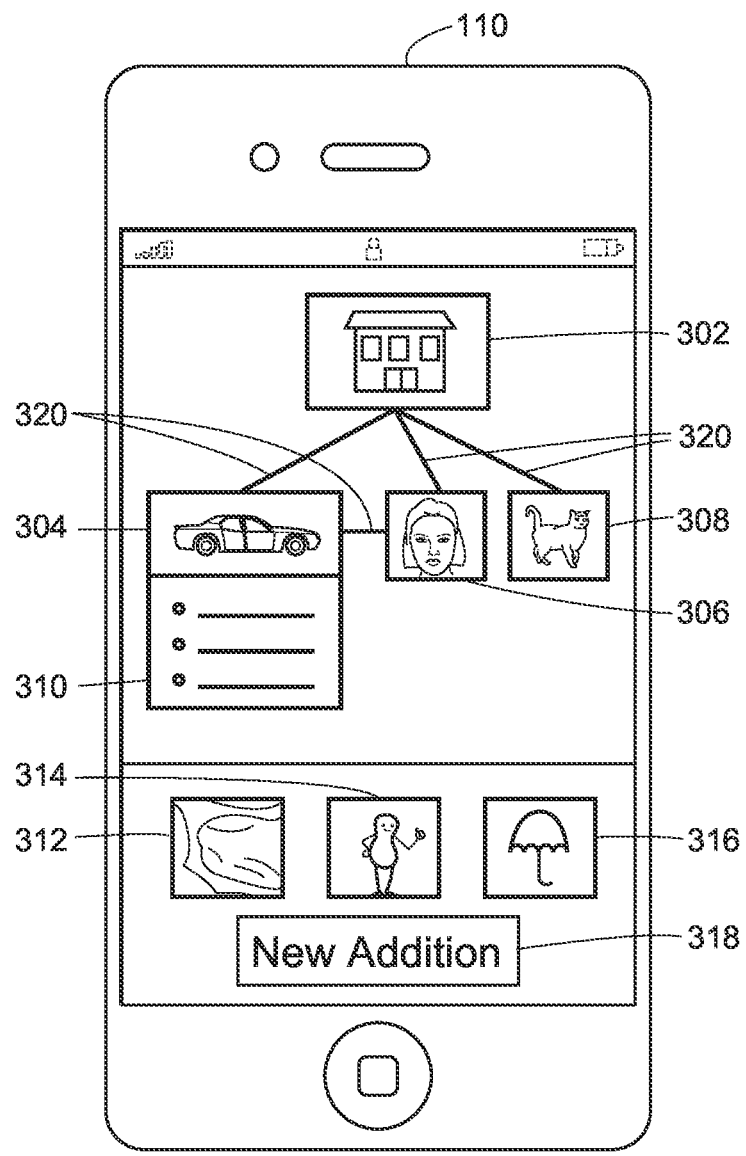
FIG. 3 depicts an exemplary embodiment of a user interface illustrating image objects displayed on a client device.

FIG. 3 depicts an exemplary embodiment of a user interface 300 illustrating image objects displayed on a client device 110. The exemplary embodiment illustrates a plurality of images 302-308 corresponding to image objects representing a dwelling, a vehicle, a household member, and a pet. Additional suggested image objects 312-316 may be further presented in the interface, along with an new addition option 318 to add a new image object that is not in the group of suggested image objects. In some embodiments, an information summary 310 may be displayed for some objects, either initially or upon a user request. Additionally, some images may be connected via links 320, which visually represent associations between image objects stored in the database 146. In some embodiments, the user interface may display image objects grouped by or associated with an insurance policy, while in other embodiments, the user interface may display image objects associated with one image object selected by the user. Although one embodiment is depicted in FIG. 3, it should be understood that it is merely illustrative, as depicting all potential embodiments would be impractical, if not impossible.

In the exemplary user interface 300, the dwelling image 302 may represent an insured dwelling, such as a house, condominium unit, apartment, or other real property. The image 302 displayed on the client device 110 may be a photograph, icon, or other image associated with information regarding the dwelling by an image object. As discussed above, the image object may further be associated with one or more data items containing information regarding the underlying object. For example, the image object for a house may be associated with the dwelling image 302 and data items indicating information such as the following: the location of the property, type of dwelling, owner, ownership status, year of construction, assessed value, most recent sale information, size of the dwelling, number and type of rooms, residents, or other relevant information. For those image objects associated with an insurance policy, the image object may further include an association with one or more insurance policies. The links 320 illustrate the associations between the image objects represented by the images 302-308.

Additionally, in some embodiments, the some or all data items regarding an image object may be presented to the user in the information summary 310. For example, the information summary 310 shown for the vehicle image 304 may indicate a name for the vehicle (e.g., "car," "truck," "Bob's Car," etc.). Additionally, or alternatively, the information summary 310 may present information regarding the year, make, and model of the vehicle, the location where the vehicle is garaged, the vehicle's primary use, or other data items relevant to insurance associated with the vehicle. Such data items may be entered by the user, retrieved from the database 146, or obtained from the data sources 170. For example, if the vehicle associated with the vehicle image 304 is insured by a different insurer, the server 140 may request information regarding the vehicle from a data source 170 associated with the different insurer to present in the information summary 310. In some embodiments, the server 140 may store part or all of the information obtained from the data source 170 in the database 146, which stored information may be updated periodically or as needed (e.g., upon request by the user or when adjusting another insurance policy).

In some embodiments, the summary information 310 may include options for the user to edit the associated image object, such as by adjusting an associated insurance policy or updating the data items. Although the summary information 310 is shown as appearing adjacent to the image 304, it should be understood that other means of presenting the summary information 310 may be used, such as a pop-up window, a full-screen window, a graphical representation of the data items (which may include data items for which information is missing but expected for the image object type), or other types of graphical or textual displays of information. In further embodiments, the summary information 310 may include suggested data items determined by the server 140 and presented to the user for verification or correction.

The suggested image objects 312-316 may be presented to the user automatically or in response to a request by the user to add a new image object. For example, the suggested image objects 312-316 may be determined and presented to the user upon the user's selection of the new addition option 318. Alternatively, the new addition option 318 may allow the user to create a new image object by entering information or selecting an image (which may be an image captured by the image capture unit 114 of the client device 110). The suggested image objects 312-316 may be represented by images associated with the client device or an account associated with the user. For example, images associated with a social media account of the user may be analyzed to determine potentially insurable objects, which may include tangible property (personal or real), associated persons (such as dependents or spouses), or other objects. Some suggested image objects may correspond to intangible objects or other items for which no direct image exists, in which case icons or generically representative images may be presented. For example, suggested image object 316 may represent an umbrella insurance policy by an icon of an umbrella.

Figure 4:
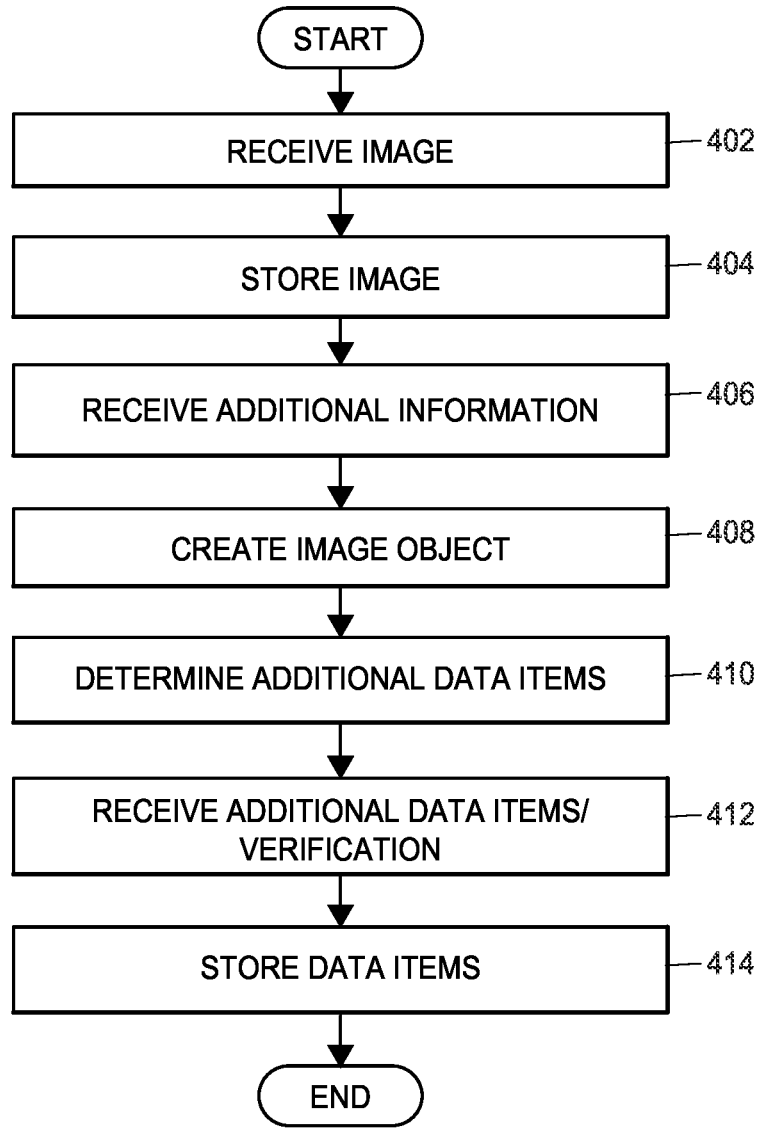
FIG. 4 illustrates a flow diagram of an exemplary embodiment of an image object creation method for generating new image objects.

FIG. 4 illustrates a flow diagram of an exemplary embodiment of an image object creation method 400 for generating new image objects using the system 100. The method may be automatically initiated by the server 140 or the client device 110, may be triggered by a user or customer action, may be periodically implemented by the server 140, or may be started by a request from a user via the client device 110. The method 400 may receive an image file at block 402, store the image at block 404, receive additional information relating to the image at block 406, and create an image object in the image object table 210 at block 408 for the stored image. Creating the image object at block 408 may include recording data items associated with the image object, in some embodiments. The method 400 may then determine additional data items at block 410 and receive verification of the data items, corrections, or further data items from the user at block 412. In some embodiments, the determination or verification at blocks 410 and 412 may occur prior to creation of the image object at block 408. This may be advantageous in avoiding creation of image objects without data items or automatic creation of image objects not useful to the user. At block 414, the determined or received data items may be stored in the data table 220, and the method 400 may terminate.

At block 402, the client device 110 or server 140 may receive an image from which to create an image object. The image may include a photograph, an icon, a custom image created or selected by a user, or a default image for a type of image object. In some embodiments, the image may be selected by a user. In other embodiments, the image may be determined by the client device 110 or server 140. In further embodiments, one or more images may be identified by the client device 110 or the server 140 and presented to the user for selection. In embodiments in which the image is identified or determined automatically, the server 140 or client device 110 may access images stored on the client device 110 or otherwise associated with a user or insurable object. For example, the server 140 may determine a customer address based upon information already available (such as through records associated with an insurance policy), which may further be used to search for images of the address in a database 146 or available from a data source 170 (e.g., publicly available third-party images of buildings indexed by address that may be searched via a web site). One or more such automatically identified images may be presented to the user via the client device 110 for selection. If the user selects one or more images, the selected images may then be stored in the database 146 or other computer memory associated with the client device 110 or server 140 for later reference.

At block 406, the client device 110 or server 140 may receive additional information relating to the image, in some embodiments. This information may include a name or user identifier of the image (e.g., "apartment," "new car," Tom, etc.), which may be entered by the user via the client device 110 using any known means, including a keyboard, microphone, touchscreen, etc. In some embodiments, the client device 110 or server 140 may attempt to geotag the image by identifying a geographical location associated with it. For example, the user may use the client device 110 to take a photograph via the image capture unit 114, which may be associated with GPS coordinates obtained via the GPS module that indicate the location of the client device 110 at the time the photograph is taken. This may thus approximate the location of the photographed object. Such geotags may be utilized in a known manner to determine the physical location of the image or object, such as by using mapping software. In some embodiments, no additional information may be received at block 406, in which case the method may continue without such additional information.

At block 408, the server 140 may generate the image object using the received information and image. Generating the image object may include creating an entry for the image object in the image object table 210. In some embodiments, corresponding entries may be added to the data table 220 (which may include any additional information received at block 406) and the image table 230 (which may include a reference to the location of the image stored at block 404). In some embodiments, additional information may be determined or received at blocks 410-412 either before or after the new image object is created.

At block 410, in some embodiments, the server 140 may determine additional data items that may be associated with the image object. The additional data items may be determined based upon information derived from the image, information associated with the image, or additional information associated with the image object. Information derived from the image may include object recognition or recognition of text within an image by image recognition and text recognition modules. For example, an image of a vehicle may identify it as a vehicle and may further identify the specific vehicle using a portion of the image that includes a license plate. Further data items may be determined in this example by accessing a data source 170 that includes information regarding vehicles based upon license plate identifiers. Thus, an image of a vehicle showing a license plate may be processed by image recognition and text recognition modules of the server 140 to extract a license plate number, which the server 140 may then use to obtain additional information on the make, model, year, registration, owner name, likely garage location, etc. from one or more databases maintained by public or private third parties. Such additional information may be used to create data items in the data table 220, as well as serving as the basis for obtaining further information from data sources 170. For example, the server 140 may use information regarding the identity of the vehicle owner to obtain further information regarding the vehicle owner.

Information associated with the image may include information regarding a location or time associated with the image, as well as additional information received at block 406. In addition, information from a context of an image may be associated with the image, which context may be derived from other images or may be based upon text associated with the image. For example, an image captured at approximately the same time as other images with identifiable locations or objects may be associated with information associated with those images. Thus, the server 140 may determine information for an image object associated with a vehicle based upon an image of the vehicle taken at approximately the same time as an image of a house covered under an insurance policy. As another example, an image of a vehicle associated with a communication (e.g., e-mail, SMS text message, etc.), web site, social media post, or other electronic text may be associated with information derived from the associated text.

Information associated with the image object may include additional information received at block 406, including information relating to the user, insurance customer, or insurance policy associated with the image object. Such information may be determined by the server 140 based upon the user's previous interaction with the client device 110 (e.g., logging in to an application or web site). In some embodiments, default data items for a type of image object may be determined, such as insurance coverage types or limits based upon information regarding the user or insurance policy, common values for similar image objects associated with other users, or mandatory minimum coverage levels.

At block 412, the user may be presented with options to add additional data items or to verify or correct the data items determined at block 410 via the client device 110. The options may allow the user to enter additional data items via an input unit of the client device 110. To facilitate such entry, in some embodiments, the user may be directed through a series of prompts to enter information relevant to the image object. The user may select an option to enter additional data items via the client device 110, or the client device 110 or server 140 may determine that additional data items should be entered and prompt the user. In embodiments in which additional data items have been determined at block 410, the client device 110 may display options to the user to review part or all of the determined information. For example, the determined information regarding the make, model, year, and estimated mileage of a vehicle may be presented to the user to verify or correct. In some embodiments, default information (such as default insurance policy coverage and limit options) may be presented to the user for review or adjustment, either automatically or upon a request from the user to view such information. In some embodiments, the user may select an option to drill down into the data. This may first include selecting the image to view a limited set of data and may further include selecting parts of the information to view more details.

At block 414, the server 140 may store the additional data items in the database 146. This may include updating one or more entries in the data table 220 associated with the image object. In some embodiments, the server 140 may store the data items upon initial receipt or determination. In other embodiments the server 140 may wait to store the data items until the user has verified them or there are no further actions regarding the image object received from the user via the client device 110. The method 400 may then terminate or restart for another image object.

Figure 5:
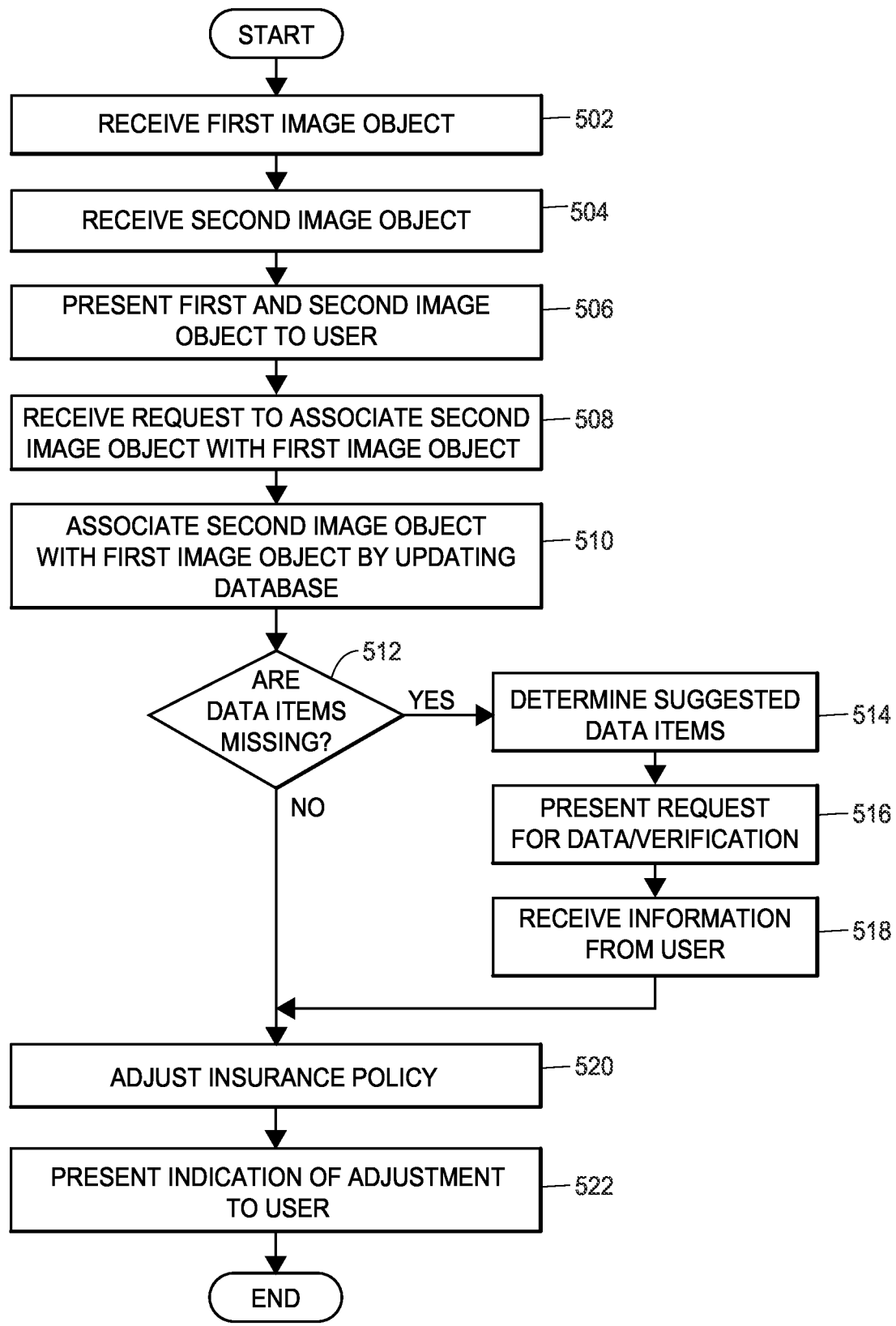
FIG. 5 illustrates a flow diagram of an exemplary embodiment of an image object association method for using image objects to obtain or adjust insurance policies.

FIG. 5 illustrates a flow diagram of an exemplary embodiment of an image object association method 500 for using image objects to obtain or adjust insurance policies. The method 500 may incorporate the method 400 to add new image objects or may be implemented with existing image objects. At blocks 502 and 504, the method 500 may begin by receiving first and second image objects, which may be presented to the user via the client device 100 at block 506. At block 508, a request to associate the second image object with the first image object may be received, and the server 140 may associate the image objects in the database 146 at block 510. In some embodiments, the second image object may be checked to determine whether any necessary information is missing at block 512. If information is missing or incomplete, the server 140 may attempt to determine the missing information at block 514. Alternatively, or additionally, the user may be presented with a request for the missing information or to verify the determined information at block 516, and the user's response may be received at block 518. The server 140 may then evaluate or adjust an insurance policy based upon the association of the image objects and any new or revised data items at block 520. An indication of an adjustment to an insurance policy may be presented to the user via the client device 110 at block 522.

At block 502, the server 140 may receive a first image object. The first image object may be received in response to a user selection via the client device 110 or may be received based upon a request generated by the server 140. Such server-generated requests may occur in response to triggering events, such as the determination of a new suggested image object or a change in an insurance policy's terms, or may occur periodically. User selections that may cause the server 140 to receive a first image object may include accessing or interacting with an application or web site associated with the insurer via the client device 110. The first image object may include an insurable object, another object, an account, or an insurance policy associated with the user. In some embodiments, the first image object may indicate a type of insurance policy the user may obtain or purchase but which the user has not yet obtained or purchased. For example, the first image object may represent a type of homeowners insurance policy available to the user. The first image item may further include a new insurance policy of the same type as an insurance policy the user has already obtained. In some embodiments, the first image object may include an insurable object for which an insurance policy associated with the user already exists. In some embodiments, receiving the first image object may include receiving an indication of the first image object at the server 140, and further embodiments may include accessing information associated with the first image object from the database 146.

At block 504, the server 140 may receive a second image object. In some embodiments, the second image object may be associated with an object not covered by an insurance policy or not covered by an insurance policy associated with the first image object. The second image object may include an insurable object or another object that may be associated with an insurance policy. For example, the second object may include a vehicle that may be insured, or the second object may include a beneficiary on an insurance policy. In some embodiments, the second image object may be associated with one or more of the following objects: a bank account, a brokerage account, another insurance policy, a lienholder, a secured party, a dependent, a spouse, or a beneficiary. Receiving the second image object at block 504 may include receiving or determining data items associated with the second image object in some embodiments, as discussed below. In further embodiments, receiving the second image object may include receiving a selection of one or more image objects as discussed further below.

At block 506, the server 140 may cause the client device 110 to present a first image associated with the first image object and a second image associated with the second image object to the user via the display 112. Although only two images and image objects are discussed herein for clarity, it should be understood that additional images associated with additional image objects or suggested image objects may be presented to the user, such as illustrated in FIG. 3. For example, any of images 302-308 may be the first image of method 500, and any of FIGS. 312-316 may be the second image. Other combinations or configures are likewise possible within the scope of the method of which method 500 is an example.

At block 508, the server 140 may receive a request from the user via the client device 110 to associate the second image object with the first image object. The user may cause such a request to be generated by selecting the second image and dragging it onto the first image, selecting the second and first images in order, or other means of interacting with the images on the display 112 to indicate a desire to create an association between the two image objects. In some embodiments, the associations may be reciprocal, such that associating the first image object with the second image object is equivalent to associating the second image object with the first image object. In other embodiments, the associations may be directions, such that there is a difference between associating the first image object with the second image object and associating the second image object with the first image object. Such associations may be implemented using entries in the image object table 210 or the data table 220, which may indicate a directionality of the association in some embodiments. Additionally, if either the first or second image objects are newly created image objects, they may be added to the database 146 as indicated in the method 400, as well as associated to the other image object. In some embodiments, the request to associate the second image object with the first image object may include a request to cause the second object to be covered by an insurance policy associated with the first image object. For example, associating a second image object associated with a driver with a first image object associated with a vehicle having an automobile insurance policy may indicate a request to add the driver as an insured driver on the automobile insurance policy.

At block 512, the server 140 may determine whether any data items are missing or incomplete for the first image item or the second image item. In some embodiments, the server 140 may determine only if a subset of data items that constitute necessary or required data items are missing or incomplete. For example, information regarding the name and interest of a beneficiary to a life insurance policy may be required, as well as information providing at least one means to contact the beneficiary. Other means of contacting the beneficiary or additional identifying information, such as age or county of residence, may not be required. If no data items are determined to be missing, the method 500 may continue at block 520. In some embodiments, however, part or all of the data items may be presented to the user for review and verification before proceeding, even if no required information is missing. If data items are determined to be missing or incomplete at block 512, the process may continue to obtain the missing information.

At block 514, in some embodiments, the server 140 may determine one or more suggested data items. The suggestions for data items may be based upon the first or second images, the information associated with the first or second image objects, or other information associated with the user, an insurance policy, or other image objects associated with the user, in a manner similar to that described above. At block 516, the server 140 or client device 110 may cause a request to be presented to the user to provide information or verify information determined at block 514. Where more than one suggested data item is determined at block 514 for the same aspect of an object, the request may ask the user to select between alternative suggested data items or enter a different data item. In some embodiments, the presentation may include one or more options to view, select, or edit information relating to one or more data items or one or more image objects. At block 518, the client device 110 may receive a user selection, verification, correction, or entry of one or more data items in response to the request. The client device 110 may then transmit the information via the network 130 to the server 140, which may receive the one or more data items. Once all necessary data items are received or default values determined, the method 500 may continue at block 520.

At block 520, the server 140 may adjust an insurance policy associated with the first image object based upon the association of the second image object to the first image object. This may include adjusting the insurance policy based upon information determined or received in blocks 514-518. The server 140 may determine one or more changes to the insurance policy terms, coverage (e.g., scope, type, deductibles, limits, etc.), costs (e.g., premiums, discounts, surcharges, etc.), or other relevant aspects of the insurance policy. Where the request to associate the second image object includes a request to add the second object to the coverage of an insurance policy associated with the first image object, the server 140 may cause such coverage to be implemented. Similarly, where the first image object represents a potential new insurance policy, the server 140 may cause the new insurance policy to be created. The server 140 may then cause the determined changes to be implemented, which may include facilitating a payment or credit on a customer account, obtaining customer authorization on new policy documents, propagating changes within a recordkeeping system, or taking other similar actions. At block 522, the server may further cause an indication of the adjustment of the insurance policy to be presented to the user via the client device 110. The method 500 may then terminate.

Figure 6:
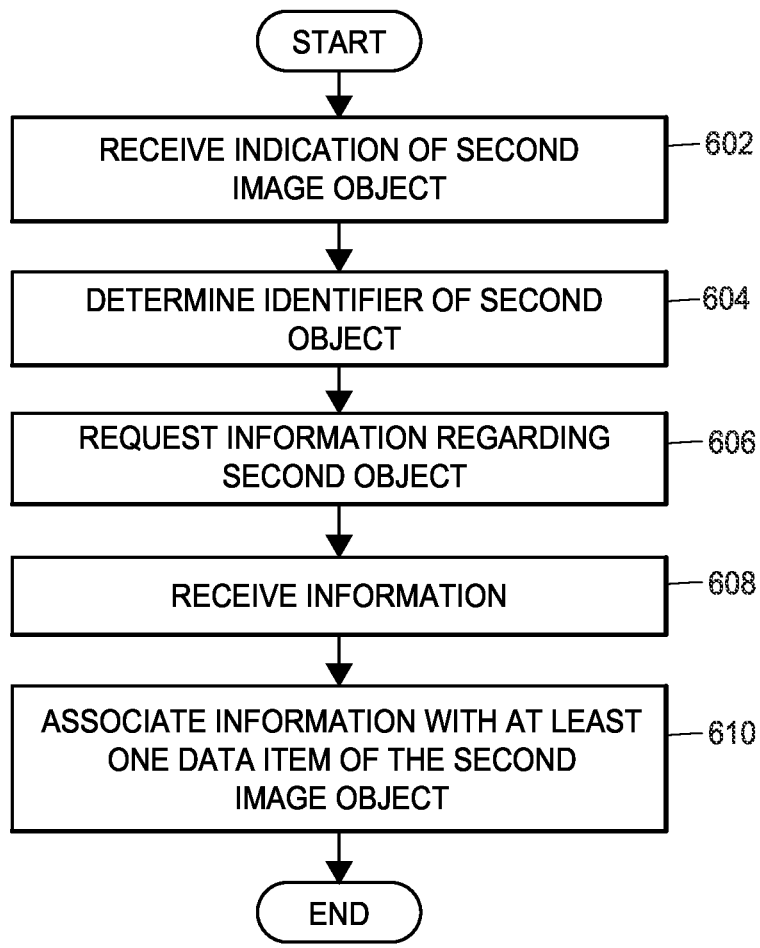
FIG. 6 illustrates a flow diagram of an exemplary embodiment of a data item determination method that may be used to determine information to associate with an image object.

FIG. 6 illustrates a flow diagram of an exemplary embodiment of a data item determination method 600 that may be used to determine information to associate with an image object. The method 600 may particularly be used to determine one or more data items to associate with the second image object received at block 504. After receiving an indication of the second image object at block 602, an identifier of a second object associated with the second image object may be determined at block 604. Information regarding the second object may be requested based upon the identifier at block 606 and received at block 608. At block 610, the information may be associated with one or more data items of the second image object.

At block 602, the server 140 may receive an indication of the second image object. The indication may include an image, an identifier value of an image object stored in the image object table 210, a name for the image object, or some other information identifying the second image object. In some embodiments, the indication may include a selection of a suggested image object by the user via the client device 110. For example, the indication of the second image object may be a selection of an image stored or displayed on the client device 110, which image may represent a suggested image object.

At block 604, the server 140 may determine an identifier of the second object based upon the received indication of the second image object. This may include determining the type, location, or other specific information regarding the second object associated with the second image object. The identifier may uniquely or generally identify an object associated with the second object represented by the second image object. General identifiers may include the general type of the object, such as the make and model of a vehicle or the age and sex of a person. Specific identifiers may include information specifically identifying a particular object, such as a license plate, a GPS location of a house, an address of an apartment, a license number of a person, or other similarly specifically identifying information. For example, when the indication of the second image object is a suggested image object selected by the user via the client device 110, the server 140 may process the image associated with the selected suggested image object using an image or text recognition module to determine information regarding the second object, as described above. In some embodiments, determining the identifier may include requesting and receiving information or verification regarding the identifier from the user via the client device 110. In further embodiments, the identifier may be automatically determined by the server 140 based at least in part upon one or more of the following aspects: an image captured by the user via the client device, a sound captured by the user via the client device, or a geographical location determined based upon the location of the client device. In some embodiments, the server 140 may determine the identifier by a combination of aspects, such as by combining GPS coordinates with an image to determine an exact address for a dwelling.

At block 606, the server 140 may request information regarding the second object from one or more databases 146 or data sources 170 based upon the determined identifier. For example, construction information for a dwelling (e.g., type, age, number of rooms, square footage, etc.) may be determined from a database maintained by a city or county government, while additional information regarding the value of the dwelling (e.g., purchase price history, estimated price based upon comparable sales, etc.) may be determined from a privately operated or commercially available database. In some embodiments, the server 140 may request information from one or more proprietary databases 146 associated with the insurer, which may include contain information regarding insurance customers, insurance policy, or other objects covered by insurance policies (e.g., garaging address and insured drivers for other automobiles). Additionally, or alternatively, the server 140 may request information regarding the second object from the user via the client device 110.

At block 608, the server 140 may receive information from one or more databases 146 or data sources 170 in response to the request or requests at block 606. If one or more requests at block 608 are directed to the user via the client device 110, the server 140 may receive information from the client device 110 via network 130 at block 608. In some embodiments, the server 140 may further attempt to verify the received information, either automatically or by presentation to the user. In further embodiments, the server 140 may store the received information in a database 146, either in the form received or in another form convenient for association with image objects.

At block 610, the server 140 may associate the received information with one or more data items of the second image object. In some embodiments, this may include determining appropriate data items for the information. The server 140 may further process or analyze the received data to determine one or more data items, which may include extracting relevant data from the received information or combining information from a plurality of sources. Associating the information with the second image object may include storing one or more data items in the data table 220 in entries associated with the second image object.

Figure 7:
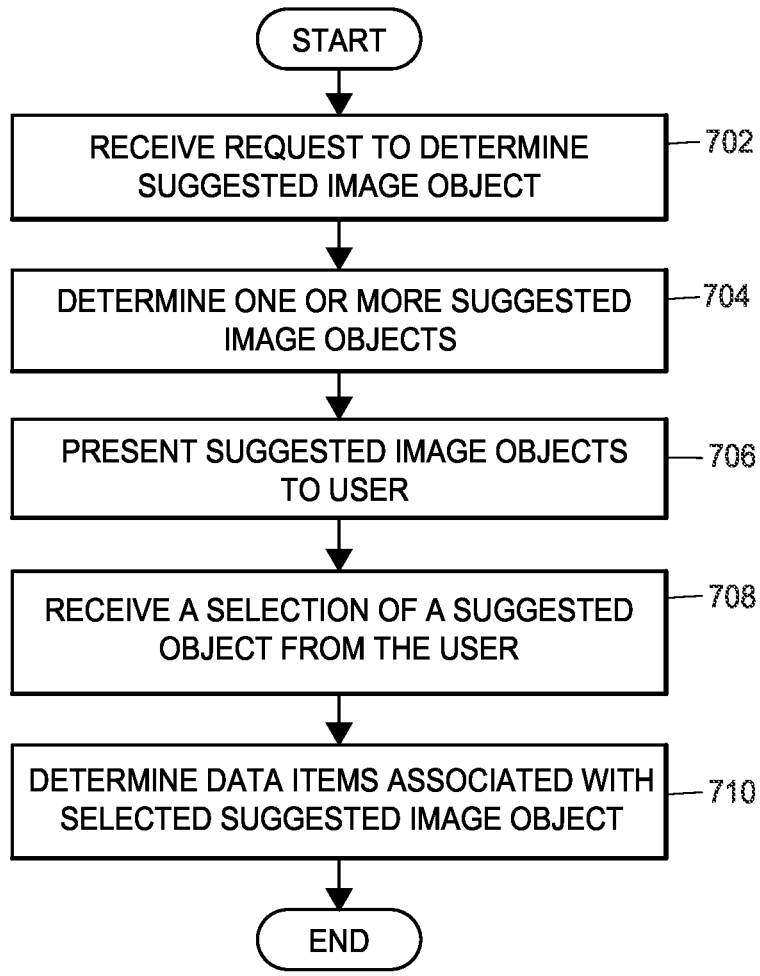
FIG. 7 illustrates a flow diagram of an exemplary embodiment of an image object recommendation method that may be used to determine and recommend image objects to a user.

FIG. 7 illustrates a flow diagram of an exemplary embodiment of an image object recommendation method 700 that may be used to determine and recommend image objects to a user. The method 700 may particularly be used to receive a second image object at block 504 by suggesting image objects to the user and receiving a selection of at least one of the suggested image objects. The selection of the suggested image object may be received as an indication of the second image object at block 602 to identify and determine data items associated with the second image object. The method 700 may begin at block 702 when the server 140 receives a request to determine one or more suggested image objects, which may be generated by the user or automatically by the server 140 or client device 110. The server 140 may then determine one or more suggested image objects at block 704, present the suggested image objects to the user at block 706, and receive a selection of a suggested image object at block 708. In some embodiments, the server 140 may further determine one or more data items associated with the selected image object at block 710.

At block 702, the server 140 may receive a request to determine one or more suggested image objects. In some embodiments, the request may be received from the user via the client device 110. The user request may be a general request to suggest image objects or may be a specific request to suggest image objects associated with a particular object. When the user request is a specific request, the server 140 may receive an indication from the user of the object with which the image object should be associated. For example, the user may request a suggested image object based upon an image, a location, entered text, or recorded speech. In other embodiments, the client device 110 may cause a request to be generated based upon a user action that triggers such request, such as viewing information about another image object or an insurance policy in an application or web page. Other triggers may likewise be used, such as selecting a first image associated with a first image object. In further embodiments, the server 140 may generate a request to determine suggested image objects without user input or action. For example, the server 140 may determine suggested image objects at fixed or variable periods of time. Additionally, or alternatively, the server 140 may generate a request based upon information regarding the user, such as images stored on the client device 110 or uploaded to a web site or social media network, user e-mail correspondence, or other sources of information from the user or third parties. In such and similar embodiments, the server 140 may proceed to determine one or more suggested image objects without receiving a request from the user to determine the one or more suggested image objects.

At block 704, the server 140 may determine one or more suggested image objects based upon the received request. Determining suggested image objects may include determining objects that may be associated with an indication of an object included in the request, determining objects that may be associated with a first object associated with a first image object, or determining objects based upon information regarding the user or recent user activity. For example, if a user has recently taken sever photographs with the client device 110 of a house, the suggested image objects may include a suggested image object associated with one or more of the images and further associated with a house. If additional geotagging or other information is available, further information may be associated with the suggested image object. In some embodiments, this may include determining suggested image objects associated with an object indicated by the user at block 702. In further embodiments, this may include determining suggested image objects that may be associated with a first image object. Where the user has selected or viewed a first image object, it may be particularly advantageous to determine one or more suggested image objects that may be associated with the first image object based upon information associated with the first image object without receiving a request from the user to determine the one or more suggested image objects.

At block 706, the server 140 may cause the one or more suggested image objects to be presented to the user via the client device 110 for review. This may include presenting images associated with each of the one or more suggested image objects on the display 112. At block 708, the server 140 may receive a selection by the user of one or more of the presented image objects. The user may select an image displayed on the client device 110, an indication of which may then be transmitted via the network 130 to the server 140. Upon receiving the one or more selections, the server 140 may create an image object for each selected suggested image object if none already exists. In some embodiments, the server 140 may further determine data items associated with the selected suggested image objects at block 710 in the manner described above with respect to method 600.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention. By way of example, and not limitation, the present disclosure contemplates at least the following aspects:

1. A computer-implemented method for associating information with image objects, comprising: receiving, at an indexing module, an indication of a first image object, wherein the first image object identifies a first object associated with an insurance policy and a first image; receiving, at the indexing module, an indication of a second image object, wherein the second image object identifies a second object not associated with the insurance policy and a second image; determining, by the indexing module, one or more data items associated with the second object based upon the second image object; causing, by a display module, the first image and the second image to be presented to a user via a client device; receiving, at the indexing module, an indication of a request from the user to associate the second image object with the first image object, wherein the indication includes a selection by the user of the first image and the second image; causing, by the indexing module, the second image object to be associated with the first image object based upon the received indication from the user; and/or adjusting, by an insurance module, the insurance policy based upon the one or more data items associated with the second object.

2. The computer-implemented method according to aspect 1, wherein: the second object not associated with the insurance policy includes an insurable object, and/or adjusting the insurance policy includes causing the insurable object to be covered by the insurance policy.
3. The computer-implemented method according to either aspect 1 or aspect 2, wherein the second object not associated with the insurance policy includes at least one of the following: a bank account, a brokerage account, another insurance policy, a lienholder, a secured party, a dependent, a spouse, or a beneficiary.
4. The computer-implemented method according to any of the preceding aspects, wherein determining the one or more data items associated with the second object includes: determining, by a data acquisition module, an identifier of the second object based upon the received second image object; requesting, by the data acquisition module, information regarding the second object from a data source based upon the identifier; receiving, at the data acquisition module, at least one of the one or more data items based upon the request; and/or associating, by the indexing module, the received at least one of the one or more data items with the second image object.
5. The computer-implemented method according to aspect 4, wherein the identifier is determined automatically based at least in part upon at least one of the following: an image captured by the user via the client device, a sound captured by the user via the client device, or a geographical location determined based upon the location of the client device.
6. The computer-implemented method according to any of the preceding aspects, wherein receiving the indication of the second image object includes: determining, by a data acquisition module, one or more suggested image objects that may be associated with the first image object based upon information associated with the first image object without receiving a request from the user to determine the one or more suggested image objects; causing, by the display module, the one or more images associated with suggested image objects to the user via the client device; and/or receiving, at the data acquisition module, a selection by the user of at least one of the one or more suggested images.
7. The computer-implemented method according to any of the preceding aspects, wherein receiving the indication of the second image object includes: receiving, at a data acquisition module, an indication from the user associated with the second object; determining, by a data acquisition module, one or more suggested image objects that may be associated with the received indication from the user associated with the second object; causing, by the display module, one or more images associated with the one or more suggested image objects to be presented to the user via the client device; and/or receiving, at the data acquisition module, a selection by the user of at least one of the one or more suggested image objects.
8. The computer-implemented method according to any of the preceding aspects, further comprising: determining, by a data acquisition module, one or more missing data items associated with the second object based upon the insurance policy, wherein the missing data items indicate types of information required for adjusting the insurance policy for which no data is associated with the second image object; causing, by the display module, at least one of the one or more missing data items to be presented to the user via the client device; receiving, at the data acquisition module, information from the user regarding the at least one of the one or more missing data items; storing, by the data acquisition module, the received information regarding the at least one of the one or more missing data items; and/or associating, by the indexing module, the stored information with the second image object.
9. The computer-implemented method according to any of the preceding aspects, further comprising: determining, by a data acquisition module, one or more missing data items associated with the second object based upon the insurance policy, wherein the missing data items indicate types of information required for adjusting the insurance policy for which no data is associated with the second image object; determining, by the data acquisition module, at least one suggested data item for at least one of the one or more missing data items based upon information associated with the first image object and the data items associated with the second image object; causing, by the display module, the at least one suggested data item to be presented to the user via the client device; receiving, at the data acquisition module, an indication from the user via the client device verifying the at least one suggested data item; and/or associating, by the indexing module, the verified at least one suggested data item with the second image object.
10. The computer-implemented method according to any of the preceding aspects, wherein: the first image object associated with the insurance policy represents a type of insurance policy the user may purchase but which the user has not yet purchased; the second object not associated with the insurance policy is associated with an insurable object; the received indication of the request from the user to associate the second image object with the first image object further indicates a request to create a new insurance policy covering the second object; and/or adjusting the insurance policy includes causing the new insurance policy to be created and cover the insurable object.
11. A computer system for associating information with image objects, comprising: one or more processors; a program memory storing executable instructions that, when executed by the one or more processors, cause the computer system to: receive an indication of a first image object, wherein the first image object identifies a first object associated with an insurance policy and a first image; receive an indication of a second image object, wherein the second image object identifies a second object not associated with the insurance policy and a second image; determine one or more data items associated with the second object based upon the second image object; cause the first image and the second image to be presented to a user; receive an indication of a request from the user to associate the second image object with the first image object, wherein the indication includes a selection by the user of the first image and the second image; cause the second image object to be associated with the first image object based upon the received indication from the user; and/or adjust the insurance policy based upon the one or more data items associated with the second object.
12. The computer system according to aspect 11, wherein the executable instructions that cause the computer system to determine one or more data items associated with the second object based upon the second image object further include executable instructions that, when executed by the one or more processors, cause the computer system to: determine an identifier of the second object based upon the received second image object, wherein the identifier is determined automatically based at least in part upon at least one of the following: an image captured by the user via the client device, a sound captured by the user via the client device, or a geographical location determined based upon the location of the client device; request information regarding the second object from a data source based upon the identifier; receive at least one of the one or more data items based upon the request; and/or associate the received at least one of the one or more data items with the second image object.

13. The computer system according to either aspect 11 or aspect 12, wherein the executable instructions that cause the computer system to receive the indication of the second image object includes further include executable instructions that, when executed by the one or more processors, cause the computer system to: determine one or more suggested image objects that may be associated with the first image object based upon information associated with the first image object; cause the one or more images associated with the suggested image objects to the user; and/or receive a selection by the user of at least one of the one or more suggested images.

14. The computer system according to any of aspects 11-13, further comprising executable instructions that, when executed by the one or more processors, cause the computer system to: determine one or more missing data items associated with the second object based upon the insurance policy, wherein the missing data items indicate types of information required for adjusting the insurance policy for which no data is associated with the second image object; determine at least one suggested data item for at least one of the one or more missing data items based upon information associated with the first image object and the data items associated with the second image object; cause the at least one suggested data item to be presented to the user; receive an indication from the user verifying the at least one suggested data item; and/or associate the verified at least one suggested data item with the second image object.

15. The computer system according to any of aspects 11-14, wherein: the first image object associated with the insurance policy represents a type of insurance policy the user may purchase but which the user has not yet purchased; the second object not associated with the insurance policy is associated with an insurable object; the received indication of the request from the user to associate the second image object with the first image object further indicates a request to create a new insurance policy covering the second object; and/or adjusting the insurance policy includes causing the new insurance policy to be created and cover the insurable object.

16. A tangible, non-transitory computer-readable medium storing instructions for associating information with image objects that, when executed by one or more processors of a computer system, cause the computer system to: receive an indication of a first image object, wherein the first image object identifies a first object associated with an insurance policy and a first image; receive an indication of a second image object, wherein the second image object identifies a second object not associated with the insurance policy and a second image; determine one or more data items associated with the second object based upon the second image object; cause the first image and the second image to be presented to a user; receive an indication of a request from the user to associate the second image object with the first image object, wherein the indication includes a selection by the user of the first image and the second image; cause the second image object to be associated with the first image object based upon the received indication from the user; and/or adjust the insurance policy based upon the one or more data items associated with the second object.

17. The tangible, non-transitory computer-readable medium according to aspect 16, wherein the executable instructions that cause the computer system to determine one or more data items associated with the second object based upon the second image object further include executable instructions that, when executed by the one or more processors of the computer system, cause the computer system to: determine an identifier of the second object based upon the received second image object, wherein the identifier is determined automatically based at least in part upon at least one of the following: an image captured by the user via the client device, a sound captured by the user via the client device, or a geographical location determined based upon the location of the client device; request information regarding the second object from a data source based upon the identifier; receive at least one of the one or more data items based upon the request; and/or associate the received at least one of the one or more data items with the second image object.

18. The tangible, non-transitory computer-readable medium according to either aspect 16 or aspect 17, wherein the executable instructions that cause the computer system to receive the indication of the second image object further include executable instructions that, when executed by the one or more processors of the computer system, cause the computer system to: determine one or more suggested image objects that may be associated with the first image object based upon information associated with the first image object; cause the one or more images associated with suggested image objects to the user; and/or receive a selection by the user of at least one of the one or more suggested images.

19. The tangible, non-transitory computer-readable medium according to any of aspects 16-18, further comprising executable instructions that, when executed by the one or more processors of the computer system, cause the computer system to: determine one or more missing data items associated with the second object based upon the insurance policy, wherein the missing data items indicate types of information required for adjusting the insurance policy for which no data is associated with the second image object; determine at least one suggested data item for at least one of the one or more missing data items based upon information associated with the first image object and the data items associated with the second image object; cause the at least one suggested data item to be presented to the user; receive an indication from the user verifying the at least one suggested data item; and/or associate the verified at least one suggested data item with the second image object.

20. The tangible, non-transitory computer-readable medium according to any of aspects 16-19, wherein: the first image object associated with the insurance policy represents a type of insurance policy the user may purchase but which the user has not yet purchased; the second object not associated with the insurance policy is associated with an insurable object; the received indication of the request from the user to associate the second image object with the first image object further indicates a request to create a new insurance policy covering the second object; and/or adjusting the insurance policy includes causing the new insurance policy to be created and cover the insurable object.

What is claimed is:

1. A computer-implemented method for improving graphical user interfaces, comprising:
   accessing, by one or more processors, a plurality of data objects associated with a user of a computer device from a database, wherein each data object of the plurality of data objects includes: an identifier of a physical object represented by the data object and a reference to a representative electronic image of the physical object;
   presenting, by a display of the computer device, the plurality of representative electronic images of the plurality of data objects to the user for selection, including a first electronic image associated with a first data object of the plurality of data objects and a second electronic image associated with a second data object of the plurality of data objects;
   receiving, at the one or more processors, a user selection of the first electronic image and the second electronic image, indicating an association of the first data object and the second data object;
   adjusting, by the one or more processors, an insurance policy for a first physical object, associated with the first data object, to include a second physical object, associated with the second data object, based on the association of the first data object and the second data object;
   launching, by the display of the computer device, a pop-up window including an indication of the association of the first data object and the second data object to a user for verification or correction, wherein the pop-up window displays a graphical representation of a link between the first electronic image and the second electronic image, and an indication that the insurance policy has been adjusted to include the second physical object; and
   receiving, by the one or more processors, from the user, via the pop-up window, an indication of one of a verification or a correction of the association of the first data object and the second data object shown in the pop-up window.

2. The computer-implemented method of claim 1, wherein each identifier comprises a reference to a respective record within a data table within the database, each record storing a plurality of data items regarding the physical object corresponding to the identifier.

3. The computer-implemented method of claim 1, wherein:
   the user selection indicates a selection order in which the user selects the first electronic image prior to selecting the second electronic image to indicate a directionality of the association of the first data object to the second data object; and
   a connection data entry in the database indicates the directionality of the association of the first data object to the second data object.

4. The computer-implemented method of claim 1, further comprising:
   determining, by the one or more processors, one or more missing data items of the first data object;
   obtaining, by the one or more processors, additional data regarding the physical object associated with the first data object, wherein the additional data includes additional information regarding at least one of the one or more missing data items; and
   adding, by the one or more processors, a data entry to a record associated with the first data object storing the additional information regarding the at least one of the one or more missing data items.

5. The computer-implemented method of claim 4, wherein obtaining the additional data comprises:
   presenting, by the display of the computer device, an indication of the at least one of the one or more missing data items to the user; and
   receiving, at the one or more processors, the additional information from the user.

6. The computer-implemented method of claim 4, wherein obtaining the additional data comprises:
   determining, by the one or more processors, an identifying characteristic of the physical object associated with the first data object; and
   accessing, by the one or more processors, the additional data from the database or an external data source based upon the identifying characteristic of the physical object.

7. The computer-implemented method of claim 6, wherein determining the identifying characteristic of the physical object associated with the first data object comprises:
   obtaining, by the one or more processors, the first electronic image of the physical object associated with the first data object;
   analyzing, by the one or more processors, the first electronic image to determine a type of the physical object; and
   determining, by the one or more processors, the identifying characteristic of the physical object based at least in part upon the type of the physical object.

8. The computer-implemented method of claim 1, further comprising:
   identifying, by the one or more processors, an insurance policy associated with the second data object; and
   updating, by the one or more processors, the insurance policy based upon a connection data entry.

9. A computer system for improving graphical user interfaces, comprising:
   one or more processors;
   a program memory storing executable instructions that, when executed by the one or more processors, cause the computer system to:
   access a plurality of data objects associated with a user of a computer device from a database, wherein each data object of the plurality of data objects includes: an identifier of a physical object represented by the data object and a reference to a representative electronic image of the physical object;

present the plurality of representative electronic images of the plurality of data objects to the user for selection, including a first electronic image associated with a first data object of the plurality of data objects and a second electronic image associated with a second data object of the plurality of data objects;

receive a user selection of the first electronic image and the second electronic image, indicating an association of the first data object and the second data object;

adjust an insurance policy for a first physical object, associated with the first data object, to include a second physical object, associated with the second data object, based on the association of the first data object and the second data object;

launch, by a display of the computer system, a pop-up window including an indication of the association of the first data object and the second data object to a user for verification or correction, wherein the pop-up window displays a graphical representation of a link between the first electronic image and the second electronic image, and an indication that the insurance policy has been adjusted to include the second physical object; and receive, from the user, via the pop-up window, an indication of one of a verification or a correction of the association of the first data object and the second data object shown in the pop-up window.

10. The computer system of claim 9, wherein each identifier comprises a reference to a respective record within a data table within the database, the record storing a plurality of data items regarding the physical object corresponding to the identifier.

11. The computer system of claim 9, wherein:
the user selection indicates a selection order in which the user selects the first electronic image prior to selecting the second electronic image to indicate a directionality of the association of the first data object to the second data object; and
a connection data entry in the database indicates the directionality of the association of the first data object to the second data object.

12. The computer system of claim 9, wherein the executable instructions further cause the computer system to:
determine one or more missing data items of the first data object;
obtain additional data regarding the physical object associated with the first data object, wherein the additional data includes additional information regarding at least one of the one or more missing data items; and
add a data entry to a record associated with the first data object storing the additional information regarding the at least one of the one or more missing data items.

13. The computer system of claim 12, wherein the executable instructions that cause the computer system to obtain the additional data cause the computer system to:
determine an identifying characteristic of the physical object associated with the first data object; and
access the additional data from the database or an external data source based upon the identifying characteristic of the physical object.

14. A tangible, non-transitory computer-readable medium storing executable instructions for improving graphical user interfaces that, when executed by one or more processors of a computer system, cause the computer system to:
access a plurality of data objects associated with a user of a computer device from a database, wherein each data object of the plurality of data objects includes: an identifier of a physical object represented by the data object and a reference to a representative electronic image of the physical object;

present the plurality of representative electronic images of the plurality of data objects to the user for selection, including a first electronic image associated with a first data object of the plurality of data objects and a second electronic image associated with a second data object of the plurality of data objects;

receive a user selection of the first electronic image and the second electronic image, indicating an association of the first data object and the second data object;

adjust an insurance policy for a first physical object, associated with the first data object, to include a second physical object, associated with the second data object, based on the association of the first data object and the second data object;

launch, by a display of the computer system, a pop-up window including an indication of the association of the first data object and the second data object to a user for verification or correction, wherein the pop-up window displays a graphical representation of a link between the first electronic image and the second electronic image, and an indication that the insurance policy has been adjusted to include the second physical object; and receive, from the user, via the pop-up window, an indication of one of a verification or a correction of the association of the first data object and the second data object shown in the pop-up window.

15. The tangible, non-transitory computer-readable medium of claim 14, wherein each identifier comprises a reference to a respective record within a data table within the database, each record storing a plurality of data items regarding the physical object corresponding to the identifier.

16. The tangible, non-transitory computer-readable medium of claim 14, wherein:
the user selection indicates a selection order in which the user selects the first electronic image prior to selecting the second electronic image to indicate a directionality of the association of the first data object to the second data object; and
a connection data entry in the database indicates the directionality of the association of the first data object to the second data object.

17. The tangible, non-transitory computer-readable medium of claim 14, wherein the executable instructions further cause the computer system to:
determine one or more missing data items of the first data object;
obtain additional data regarding the physical object associated with the first data object, wherein the additional data includes additional information regarding at least one of the one or more missing data items; and
add a data entry to a record associated with the first data object storing the additional information regarding the at least one of the one or more missing data items.

18. The tangible, non-transitory computer-readable medium of claim 17, wherein the executable instructions that cause the computer system to obtain the additional data cause the computer system to:
present an indication of the at least one of the one or more missing data items to the user via the display of the computer device; and
receive the additional information from the user.

19. The tangible, non-transitory computer-readable medium of claim 17, wherein the executable instructions that cause the computer system to obtain the additional data cause the computer system to:
- determine an identifying characteristic of the physical object associated with the first data object; and
- access the additional data from the database or an external data source based upon the identifying characteristic of the physical object.

20. The tangible, non-transitory computer-readable medium of claim 14, wherein the executable instructions further cause the computer system to:
- identify an insurance policy associated with the second data object; and
- update the insurance policy based upon a connection data entry.

* * * * *